(12) United States Patent
Mayerle

(10) Patent No.: US 6,237,696 B1
(45) Date of Patent: May 29, 2001

(54) GROUND OPENER WITH DISC SCRAPER MOUNTING

(75) Inventor: Dean J. Mayerle, Saskatoon (CA)

(73) Assignee: Flexi-Coil Ltd., Saskatoon (CA)

( * ) Notice: Subject to any disclaimer, the term of this patent is extended or adjusted under 35 U.S.C. 154(b) by 0 days.

(21) Appl. No.: 09/421,241

(22) Filed: Oct. 20, 1999

(30) Foreign Application Priority Data

Oct. 20, 1998 (CA) .................................................. 2250677

(51) Int. Cl.[7] .................................................. A01B 23/06
(52) U.S. Cl. .............................. 172/558; 111/52; 111/167
(58) Field of Search .................................... 172/558, 559, 172/560, 561, 562, 563, 566; 111/163, 167, 168, 52

(56) References Cited

U.S. PATENT DOCUMENTS

| | | | |
|---|---|---|---|
| 663,436 | * 12/1900 | Heylman | 172/564 |
| 742,908 | * 11/1903 | Sanders | 172/558 |
| 832,938 | * 10/1906 | Waterman | 172/558 X |
| 1,456,581 | * 5/1923 | White | 172/343 |
| 1,791,462 | * 2/1931 | Bermel | 172/559 |
| 4,313,503 | * 2/1982 | Good et al. | 172/140 |
| 4,330,041 | * 5/1982 | Ankenman | 172/566 |
| 4,333,535 | * 6/1982 | Hentrich, Sr. | 172/572 |
| 5,269,237 | * 12/1993 | Baker et al. | 111/121 |
| 5,443,126 | * 8/1995 | Skjaeveland | 172/271 |
| 5,727,638 | 3/1998 | Woodrich et al. | 172/414 |
| 5,787,994 | 8/1998 | Friesen | 172/772.5 |
| 6,024,179 | * 2/2000 | Bourgault | 172/566 |

FOREIGN PATENT DOCUMENTS

| | | |
|---|---|---|
| 326645 | 4/1981 | (CA) . |
| 2211653 | 2/1996 | (CA) . |

* cited by examiner

*Primary Examiner*—Victor Batson
(74) *Attorney, Agent, or Firm*—Larry W. Miller; John William Stader

(57) ABSTRACT

A ground opener unit for a seeding or planting unit includes an arm attachable to an implement frame and a disc rotatably mounted to the arm for forming a furrow in the ground. A scraper assembly includes a scraper plate defining a scraper edge for contacting and scraping a surface of the disc. The scraper plate defines a mounting region remote from the edge. A scraper plate mount secures the scraper plate adjacent the disc and a resilient pad of material is interposed between the plate mounting region and the scraper plate mount. A spaced pair of fasteners extend through the mounting region to secure the scraper plate and resilient pad to the scraper plate mount. The fasteners are located in selected positions in the mounting region relative to the resilient pad such that the scraper plate is capable of being tilted or rocked when said scraper edge encounters irregularities thus assisting the scraper edge to follow the disc surface during use.

12 Claims, 6 Drawing Sheets

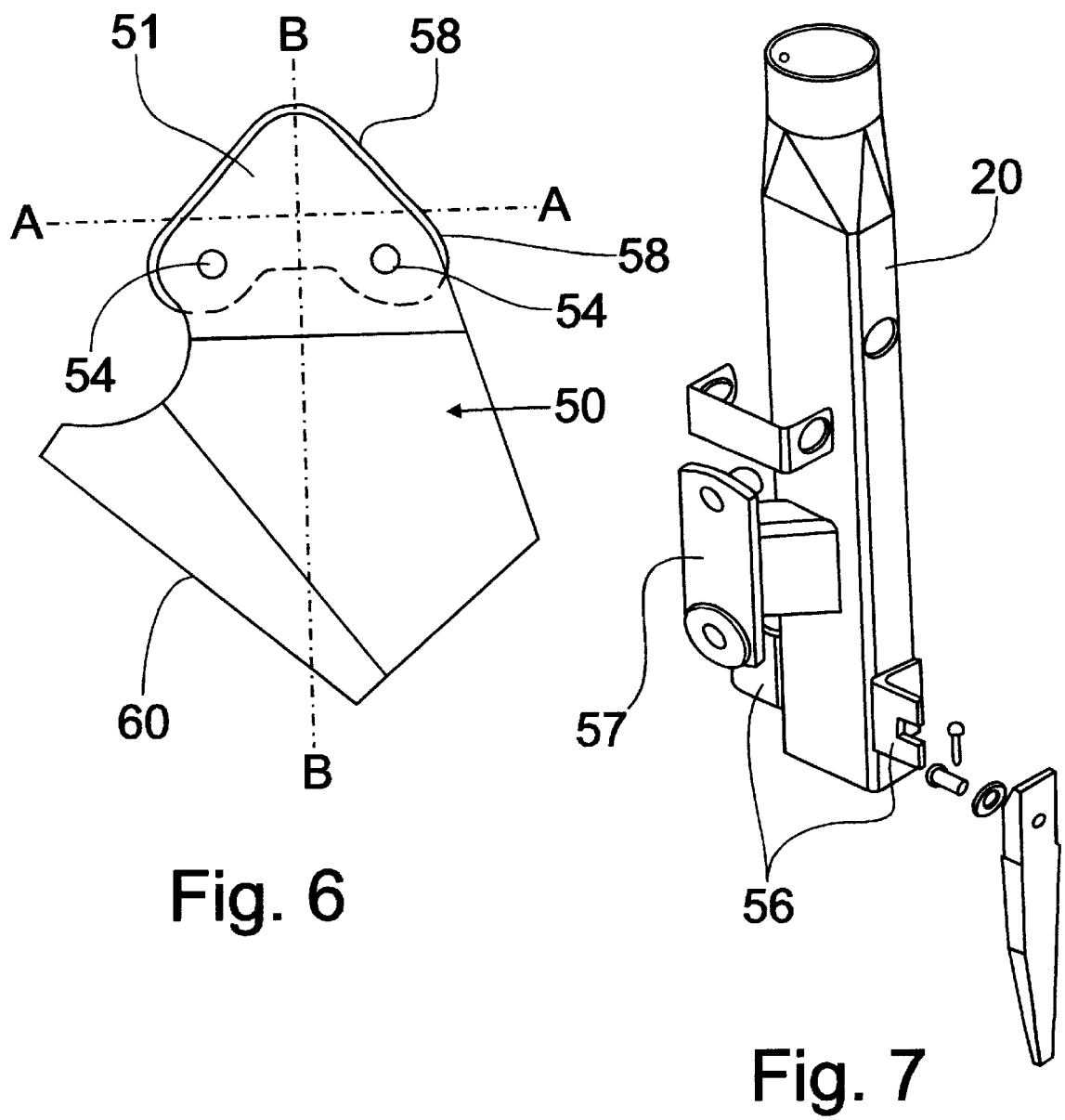

GROUND OPENER WITH DISC SCRAPER MOUNTING

BACKGROUND OF THE INVENTION

The present invention relates generally to ground opener units, particularly to planting units for forming a furrow in the ground and depositing seeds therein. More particularly, the present invention relates to equipment of the type noted above employing improved scraper devices for cleaning a surface of the disc opener used therein.

Planting assemblies of the type noted above are typically arranged such that the opener disc is held at an angle from the forward direction of travel so that the disc has a leading face and a trailing face. The disc displaces soil laterally as it travels forward and opens a furrow following the trailing face. In wet conditions, soil tends to stick to the trailing face so it is common to provide a scraper to clean the disc. The scraper also acts to prevent loose soil from falling back into the furrow until the seed is properly placed into the furrow. The disc is subject to flexing as lateral forces are applied to the disc when opening the furrow. The scraper must be held close to the disc but not so tightly as to cause a braking action on the disc; therefor the scraper must be allowed to flex and move with the disc's deflection.

The prior art has provided a variety of scraping devices for use in angled disc openers. Reference may be had for example to U.S. Pat. No. 4,760,806 and 5,787,994. Additionally, an earlier version of an implement developed by the assignee of the present invention employed a bracket which supported the disc scraper and which included a three bolt triangular pattern for adjusting the angle of the bracket. The bracket pivoted on the head of a carriage bolt as the three fasteners were tightened to effect angle adjustment. However, this prior design had a number of disadvantages in that adjustment of one fastener required corresponding readjustment of at least one of the other fasteners; adjustment of the desired angle was complicated and time consuming with the three fastener system and the bracket often became permanently deformed if one fastener was tightened without first loosening the others. Additionally, this rigid adjustment system did not allow the scraper to flex in response to irregularities or flexing of the disc blade.

SUMMARY OF THE INVENTION

The objects of the present invention are to provide disc scraper assemblies permitting quick and ready adjustment of the scraper to provide a scraper mounting giving a degree of resiliency to allow scraper flexing in response to disc irregularities or flexing of the disc during use and furthermore to provide for resiliency or rocking motion of the scraper about plural axes thereby to assist in keeping the scraper edge parallel to the disc surface while the disc flexes during use, thereby to ensure proper cleaning at all times.

A scraper assembly for a disc opener in accordance with the invention in one aspect includes a scraper plate defining a scraper edge for contacting and scraping a disc, said scraper plate defining a mounting region remote from said edge; a scraper plate mount adjacent said mounting region, a resilient component interposed between said mounting region and said plate mount, and a spaced pair of fasteners extending through said mounting region to secure said scraper plate and resilient component to said scraper plate mount, said pair of fasteners being located in selected positions in said mounting region relative to said resilient component such that said scraper plate is capable of being tilted or rocked relative to said scraper plate mount in response to forces applied to said scraper plate.

The above-noted resilient component preferably comprises a pad of resilient material. Preferably, said scraper blade tends to tilt about at least first and second axes which intersect one another.

In a preferred form of the invention said first axis extends generally parallel to a line extending between said fasteners, said scraper edge being located to one side of and spaced from the first axis and a substantial portion of the area of said resilient pad being located to the opposite side of said axis such that moments of force about said first axis are developed to assist said scraper edge to follow a disc surface.

In a preferred form of the invention said scraper edge is located to one side of and spaced from the first axis and a substantial portion of the area of said resilient pad is located to the opposite side of said axis such that moments of force about axis are developed to assist said scraper edge to follow a disc surface.

In a preferred embodiment of the invention said fasteners are capable of being tightened or loosened both individually and collectively to vary the degree of compression of said resilient pad, with collective tightening of said fasteners tending to rock said scraper plate about the first axis and to increase the force applied to a disc surface via said scraper edge while differential tightening of said fasteners tends to rock said scraper plate about said second axis whereby to affect the alignment between said scraper edge and a disc surface.

Further according to a preferred embodiment said scraper edge is disposed such that disc surface irregularities encountered by said scraper edge tend to create moments of force and rocking motion of said scraper plate about both the first and second axes.

In a further aspect of the invention the above described scraper assembly is combined with a ground opener unit including an arm attachable to an implement frame and having a disc rotatably mounted to said arm for forming a furrow in the ground. Said disc is preferably held, in use, at an angle to the forward direction of travel to displace soil and open a furrow so that said disc has a leading surface and a trailing surface with said scraper assembly being adapted to scrape said trailing surface of the disc.

It is an advantage of this invention that the two fastener adjustment is relatively simple.

It is another advantage of this invention that the resilient pad allows for scraper plate adjustment by adjusting only one of the fasteners.

It is still another advantage of this invention that the resilient pad provides bias of the scraper plate toward the disc surface while allowing flexing in response to disc deflection and that the resilient pad provides resilient bias of the scraper plate about multiple axes to keep the scraper edge parallel to the disc surface while the disc flexes during use.

These and other objects, features and advantages can be accomplished according to the instant invention by a ground opener unit for a seeding or planting unit that includes an arm attachable to an implement frame and a disc rotatably mounted to the arm for forming a furrow in the ground. A scraper assembly includes a scraper plate defining a scraper edge for contacting and scraping a surface of the disc. The scraper plate defines a mounting region remote from the edge. A scraper plate mount secures the scraper plate adjacent the disc and a resilient pad of material is interposed between the plate mounting region and the scraper plate mount. A spaced pair of fasteners extend through the mounting region to secure the scraper plate and resilient pad to the scraper plate mount. The fasteners are located in selected positions in the mounting region relative to the resilient pad such that the scraper plate is capable of being tilted or rocked when said scraper edge encounters irregularities thus assisting the scraper edge to follow the disc surface during use.

BRIEF DESCRIPTION OF THE DRAWINGS

The advantages of this invention will be apparent upon consideration of the following detailed disclosure of the invention, especially when taken in conjunction with the accompanying drawings wherein:

FIG. 6 is a side elevation view of the scraper plate per se with the resilient pad being partly shown in phantom; and FIG. 7 is a perspective view of the seed tube showing both the seed tube mount and the scraper mount.

DETAILED DESCRIPTION OF THE PREFERRED EMBODIMENT

Figure 1:
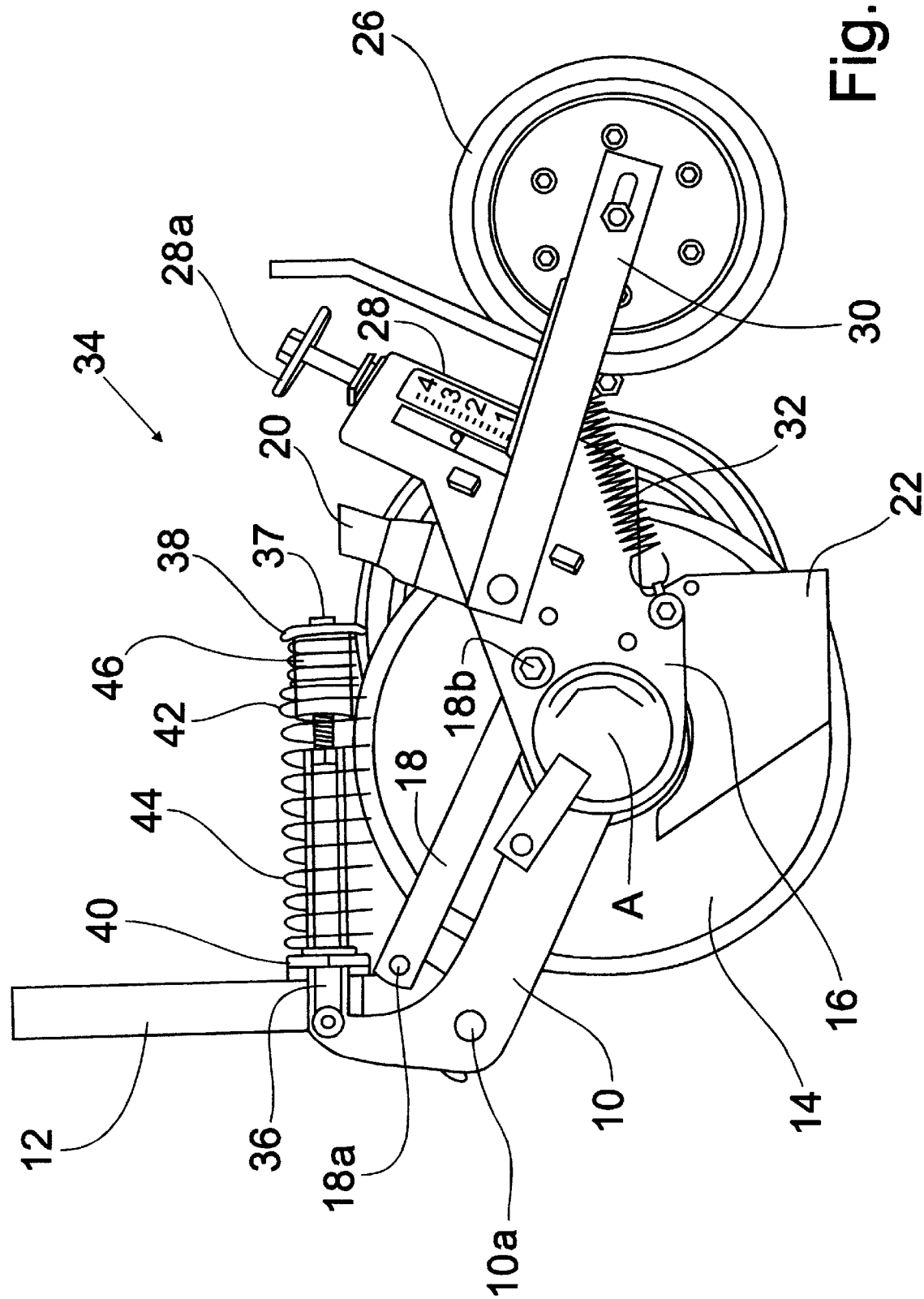
FIG. 1 is a side elevation view of a disc ground opener unit incorporating the disc scraper mounting system in accordance with an embodiment of the invention.
Figure 2:
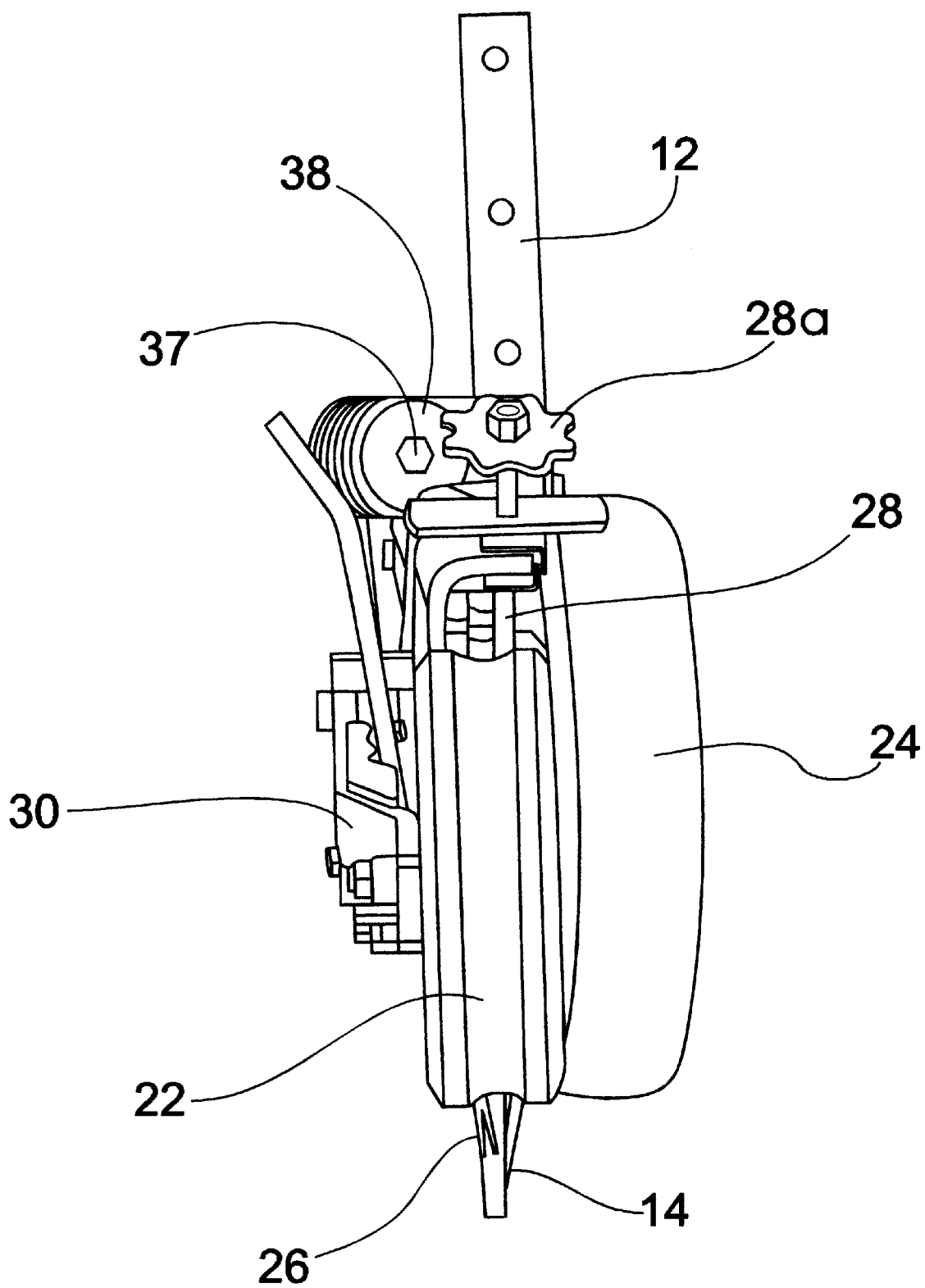
FIG. 2 is a rear end elevation view thereof.
Figure 3:
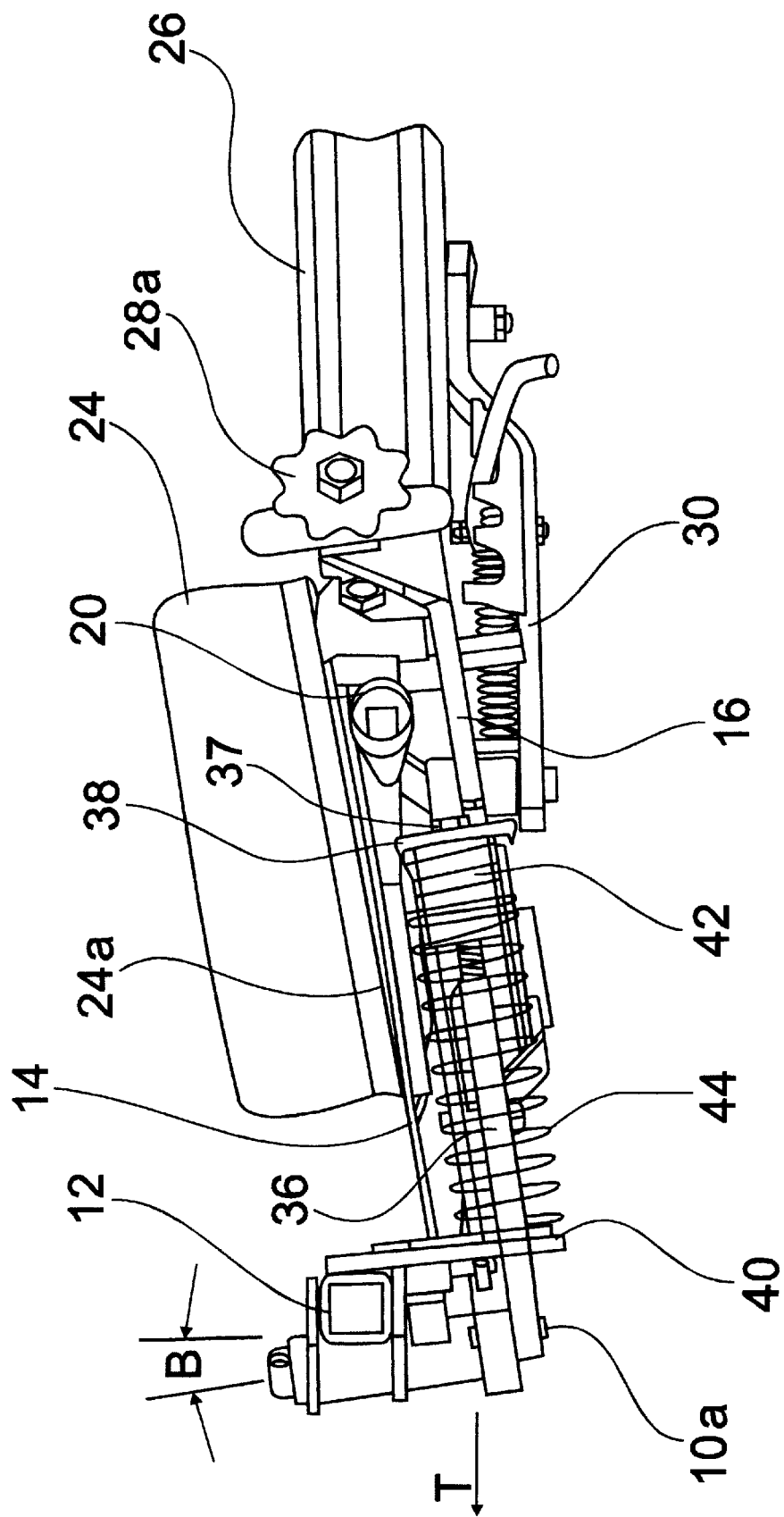
FIG. 3 is a top plan elevation view thereof.

FIGS. 1–3 show an opener assembly having the forward end of L-shaped opener arm 10 pivotally mounted to a main mounting arm 12 at pivot point 10a. Mounting arm 12 is adapted to be attached to a main implement frame (not shown) to which are attached a plurality of spaced apart opener assemblies. The trailing end of opener arm 10 pivotally supports a disc furrow opener 14 and an accessory bracket 16, opener 14 having a rotation axis A coincident with the pivot axis between the bracket 16 and arm 10. The accessory bracket 16 is further connected by a pivot link 18 extending between pivot 18a on the lower end of mounting arm 12 and a pivot 18b on accessory bracket 16 so as to form a parallel linkage arrangement with the opener arm 10 which maintains a constant orientation of the accessory bracket 16 as the opener arm 10 and link 18 pivot relative to the mounting arm 12.

A seed tube 20, disc scraper assembly 22, gauge wheel 24, and packer (closing) wheel 26 are supported on the accessory bracket 16. (Disc scraper assembly 22 including its mounting will be described in detail hereafter.) The gauge wheel 24 is rotatably mounted to depth adjustment mechanism 28 which, in turn, is mounted to accessory bracket 16. Wheel 24 is positioned adjacent one face of the disc opener 14 (FIG. 3). The wheel 24 has a resilient shallow tire extending around its perimeter having a lip 24a which engages the adjacent face of the opener disc 14 to clean the latter during rotation in known fashion. The gauge wheel 24 may be adjusted generally vertically relative to bracket 16 by rotating knob 28a to rotate an adjustment screw (not shown) of depth adjustment mechanism 28. Gauge wheel 24 thus acts as an adjustable depth control to limit the penetration of the disc opener 14 into the soil, as the wheel 24 rolls on the surface of the ground.

The pivot axis defined by pivot point 10a is angled relative to mounting arm 12 to provide a pivot angle B (see FIG. 3). The disc opener 14, gauge wheel 24, arm 10, link 18 etc. are all oriented at angle B to the forward direction of travel T of the opener assembly to effect opening of the soil in generally well known fashion.

Figure 5:
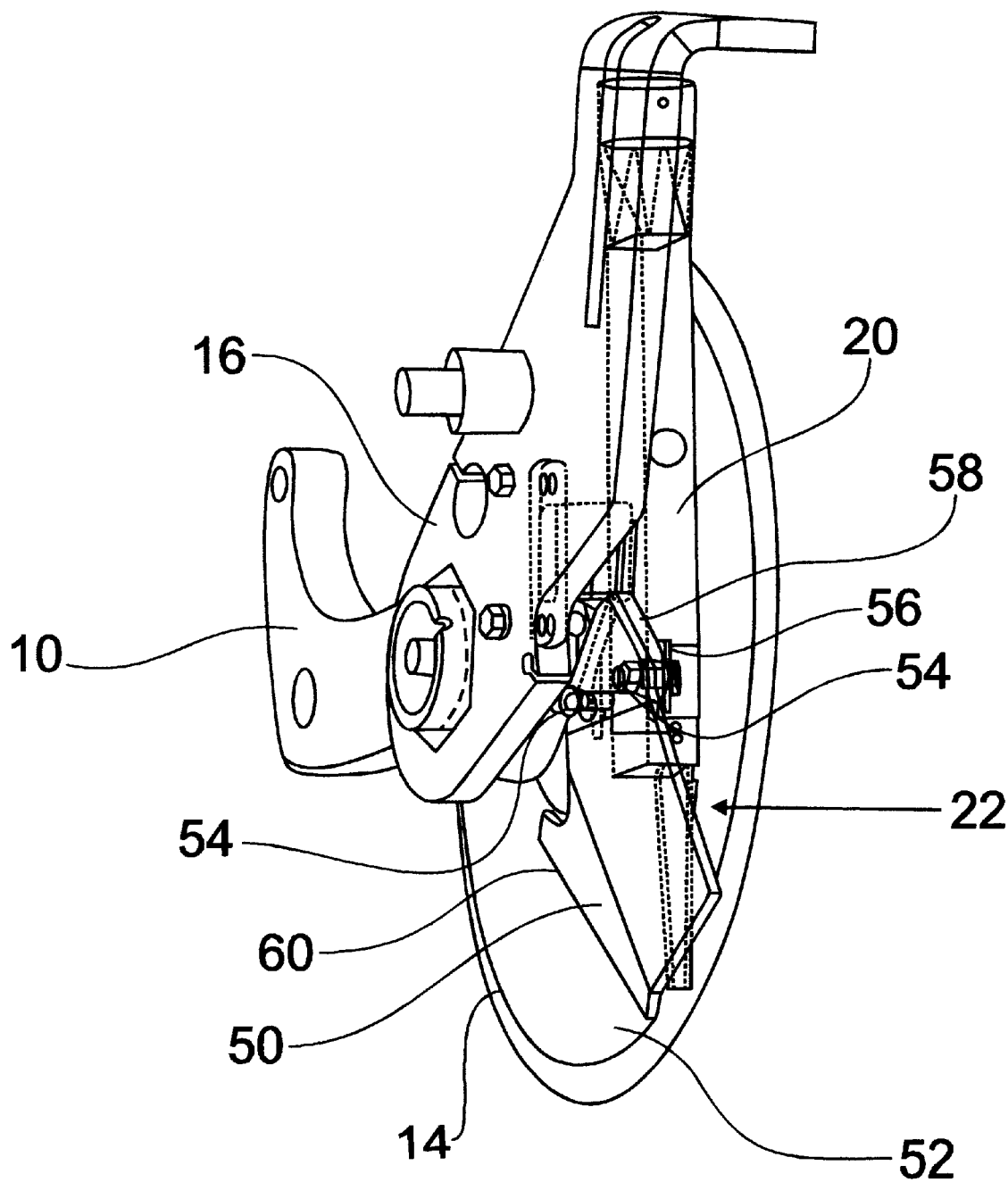
FIG. 5 is a further perspective view similar to FIG. 4 with certain otherwise "hidden" structures shown in phantom.

The packer wheel 26 is pivotally connected to the accessory bracket 16 by way of a rearwardly extended packer arm 30 (FIG. 5), and a coil tension spring 32 is connected between the packer arm 30 and accessory bracket 16 to bias the packer wheel 26 toward the ground to help close the furrow opened by disc 14 after seeds have been implanted therein via the seed tube 20 in known fashion.

A downpressure or biasing assembly 34, as described in detail in our copending application filed concurrently herewith, is connected between the opener arm 10 and the mounting arm 12 to bias the opener arm 10 toward the ground, with the reaction being received through the mounting arm 12 through to the main implement frame (not shown). The biasing assembly 34 includes a tension rod 36 having front and rear ends. A rear plate 38 is secured to the rear end of rod 36 and the front end of the tension rod 36 slidably extends through a hole in front plate 40. The front plate 40 is rigidly connected to the mounting arm 12. First and second coil springs 42, 44 are fitted over the tension rod 36 and held between the front and rear plates. The front end of the tension rod 36 is pivotally connected to the opener arm 10 at point 36a spaced from pivot 10a so that pivoting movement of the opener arm 10 causes a displacement of the tension rod 36 through the front plate 40. This changes the distance between the front and rear plates 40, 38 thus effecting a displacement of the coil springs 42,44. The springs resist compressive displacement and constantly bias the opener arm 10 and the complete opener assembly toward the ground.

The first and second springs 42, 44 are arranged in series between the plates 40, 38. The first and second springs abut each other with their opposite ends abutting the rear and front plates respectively. A sleeve 46 attached to the rear plate 38 extends through the inside of the first coil spring 42 and partially inside the second coil spring 44 to keep the springs 42, 44 in abutting alignment. The tension rod 36 includes a threaded stud 37 which extends through plate 38 and into a central bore in the forward end portion of tension rod 36 to allow the operator to adjust the effective length of the tension rod 36 by rotating stud 37 to set the precompression loading on the springs 42, 44, thus setting the range of downpressure available for the working range of the planting tool.

Referring particularly to FIGS. 4–7 the disc scraper assembly 22 includes scraper plate 50 flexibly secured adjacent one surface of the disc opener 14 to scrape materials off the disc surface as it operates in the soil. It also prevents soil from falling back into the furrow before the seed can be properly placed, and contains the seed within the furrow until it settles to rest at the bottom. The scraper plate 50 must flex in response to contact with the disc 14 as the disc flexes in response to varying forces on its surfaces as it operates in the soil.

As noted above, the disc 14 is oriented at angle B from the transverse so that as it is drawn through the soil it has a leading face and a trailing face 52 whereby the leading face displaces soil laterally and a furrow is opened following the trailing face. The scraper plate 50 is positioned adjacent the trailing face 52. The disc 14 is subject to deflections as the leading face acts to displace the soil as noted above. The scraper plate 50 is mounted such that it is able to flex when pressed on by the deflecting disc blade so there is minimal reaction from the scraper plate 50 which would otherwise cause a braking action on the disc, preventing it from rotating.

As noted above, this embodiment of the invention allows the scraper plate position with respect to the disc trailing surface 52 to be adjusted and also allows the scraper plate to deflect from this position in response to the disc deflection. Two threaded fasteners 54 secure the upper end mounting region 51 of scraper plate 50 to the scraper mount 56 (FIG. 7) with a thick resilient pad 58 of rubber or rubber-like material secured between scraper mount 56 and mounting region 51. Scraper mount 56 is fixed to the lower end of the seed tube 20, the latter in turn being bolted via seed tube mount 57 to the accessory bracket 16.

Figure 4:
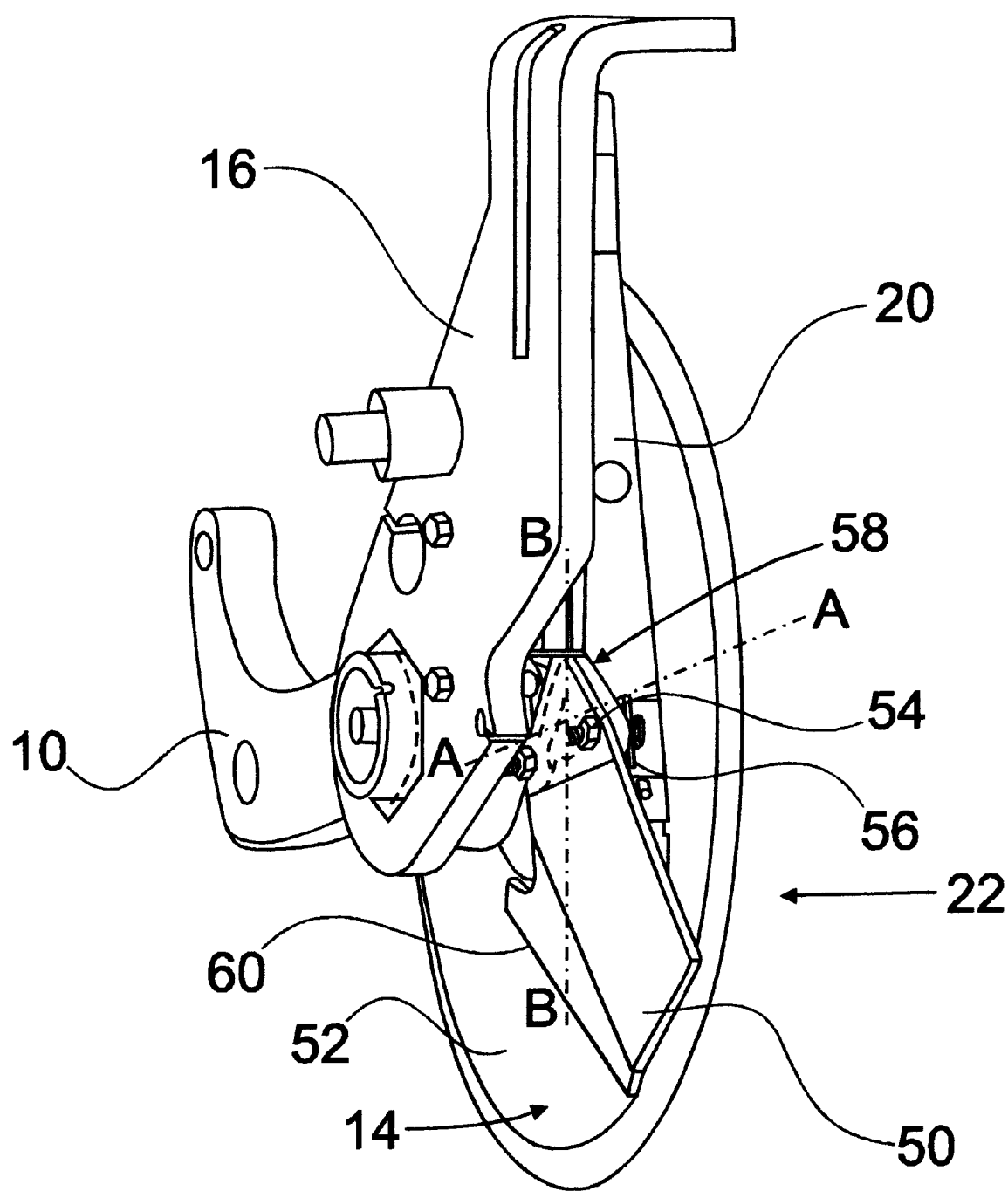
FIG. 4 is a rear perspective view of the opener disc, arm and bracket assembly showing the resiliently mounted scraper blade in position adjacent a surface of the disc.

A first axis A—A, best seen in FIGS. 4 and 6 is generally parallel to, but which may be slightly offset from, a line extending between the two fasteners 54. A second axis B—B is generally perpendicular to the first axis through a point intermediate the two fasteners 54. As will be appreciated, the rubber pad 58 does not have 2 strict axes per se. Rather it deflects in multiple directions. Fasteners 54 will constrain the deflection so that there appears to be a predominant axis A—A. Axis B—B, however, as best understood, tends to wander within a range of angles. It likely stays within a region of angles so that it remains between the fasteners 54 and passes through a centroid of the resilient pad 58. The centroid itself, will wander somewhat depending on what part of the pad 58 is more compressed. It is, however, convenient to refer to axes A—A and B—B keeping in mind that their locations are subject to some variations. The scraper plate 50 has an edge 60 at its lower end inclined obliquely and which is positioned along the disc trailing surface 52 for scraping the latter, the upper end of the scraper plate 50 being held firm against the resilient pad 58 by the fasteners 54 which are somewhat intermediate of the two scraper ends. Most of the area of the resilient pad 58 is on that side of the first axis A—A which is toward the upper end of the scraper plate.

When both fasteners 54 are adjusted in generally equal portions, the scraper plate 50 is adjusted about the first axis A—A. (When both these fasteners 54 are tightened moments of force about first axis A—A created by that portion of resilient pad 58 located above first axis A—A tend to cause the scraper plate edge 60 to press more closely to the disc surface at the lower end). When only one fastener 54 is tightened, resistance by the resilient pad 58 near the other fastener causes the scraper plate to tilt or rock slightly about the second axis B—B, changing the alignment between the scraper edge 60 and the disc trailing surface 52. Ideally the scraper edge 60 is held parallel to and against the disc trailing surface with a relatively small force and the scraper plate 50 will tilt or rock slightly about the first and second axes A—A and B—B to accommodate disc deflections etc. so that the scraper edge 60 remains generally parallel to the disc surface where it contacts the disc. The resilient pad 58 provides enough force to hold the scraper plate in its preferred position and so as to prevent soil from pressing between the scraper plate 50 and the disc surface 52 and forcing the scraper plate away from the disc. This prevents soil from creating a plug between the scraper plate and disc which might otherwise possibly plug the seed tube as well.

Preferred embodiments of the invention have been described and illustrated by way of example. Those skilled in the art will realize that various modifications and changes may be made while still remaining within the spirit and scope of the invention. Hence the invention is not to be limited to the embodiments as described but, rather, the invention encompasses the full range of equivalencies as defined by the appended claims.

Having thus described the invention, what is claimed is:

1. A scraper assembly for a disc opener comprising:
   a scraper plate defining a scraper edge for contacting and scraping a disc, said scraper plate defining a mounting region remote from said edge;
   a scraper plate mount adjacent said mounting region;
   a resilient component interposed between said mounting region and said plate mount; and
   a spaced pair of fasteners extending through said mounting region to secure said scraper plate and resilient component to said scraper plate mount, said pair of fasteners being located in selected positions in said mounting region relative to said resilient component such that said scraper plate is capable of being tilted or rocked relative to said scraper plate mount in response to forces applied to said scraper plate;
   wherein said fasteners are capable of being independently tightened and loosened to vary the degree of compression of said resilient pad, the tightening of both of said fasteners tending to rock said scraper plate about a first axis extending generally parallel to a line extending between said fasteners and to increase the force applied to a disc surface via said scraper edge while differential tightening of said fasteners tends to rock said scraper plate about a second axis so as to affect alignment between said scraper edge and said disc surface.

2. The scraper assembly of claim 1 wherein said resilient component comprises a pad of resilient material.

3. The scraper assembly of claim 2 wherein said scraper blade tends to tilt about at least said first and second axes which intersect one another.

4. The scraper assembly of claim 3 wherein said scraper edge is located to one side of and spaced from said first axis and a substantial portion of the area of said resilient pad being located to the opposite side of said first axis such that moments of force about said first axis are developed to assist said scraper edge to follow a disc surface.

5. The scraper assembly of claim 1 wherein said scraper edge is disposed such that disc surface irregularities encountered by said scraper edge tend to create moments of force and rocking motion of said scraper plate about both the first and second axes.

6. A ground opener unit for an agricultural planter comprising:
   an arm attachable to an implement frame;
   a disc rotatably mounted to said arm for forming a furrow in the ground;
   a scraper assembly including a scraper plate defining a scraper edge for contacting and scraping a surface of said disc, said scraper plate defining a mounting region remote from said edge;
   a scraper plate mount for securing said scraper plate adjacent said disc;
   a seed tube adjacent said surface of said disc for discharging seeds into a furrow formed by said disc, said seed tube being supported from said arm via a bracket, and said scraper plate mount being fixed to said seed tube;
   a resilient component interposed between said mounting region and said scraper plate mount; and
   first and second spaced-apart fasteners extending through said mounting region to secure said scraper plate and resilient component to said scraper plate mount, said pair of fasteners being located in selected positions in said mounting region relative to said resilient component such that said scraper plate is capable of being moved relative to said scraper plate mount in response to forces applied to said scraper plate.

7. The ground opener unit of claim 6 wherein said resilient component comprises a pad of resilient material.

8. The ground opener unit of claim 7 wherein said scraper blade tends to tilt about at least first and second axes which intersect one another.

9. The ground opener unit of claim 8 wherein said first axis extends generally parallel to a line extending between said fasteners, said scraper edge being located to one side of and spaced from said first axis and a substantial portion of the area of said resilient pad is located to the opposite side of said first axis such that moments of force about said first axis are developed to assist said scraper edge to follow said disc surface.

10. The ground opener unit of claim 9 wherein said first and second fasteners are capable of being tightened or loosened both individually and collectively to vary the degree of compression of said resilient pad, with collective tightening of said fasteners tending to rock said scraper plate about the first axis and to increase the force applied to said disc surface via said scraper edge while differential tightening of said fasteners tends to rock said scraper plate about said second axis whereby to affect the alignment between said scraper edge and a said disc surface.

11. The ground opener unit of claim 10 wherein said scraper edge is disposed such that disc surface irregularities encountered by said scraper edge tend to create moments of force and rocking motion of said scraper plate about both the first and second axes.

12. The ground opener unit of claim 6 wherein said disc is held, in use, at an angle to the forward direction of travel to displace soil and open a furrow so that said disc has a leading surface and a trailing surface, said scraper plate being positioned to scrape said trailing surface of the disc.

* * * * *